United States Patent [19]

Lafuze

[11] 4,176,848
[45] Dec. 4, 1979

[54] ROTARY BEARING SEAL FOR DRILL BITS
[75] Inventor: David S. Lafuze, Arlington, Tex.
[73] Assignee: Dresser Industries, Inc., Dallas, Tex.
[21] Appl. No.: 920,862
[22] Filed: Jun. 30, 1978
[51] Int. Cl.² .............................................. F16J 15/16
[52] U.S. Cl. ...................................... 277/92; 308/8.2;
175/371
[58] Field of Search ............................. 277/81, 83, 92;
308/8.2; 175/371, 372

[56] References Cited
U.S. PATENT DOCUMENTS

| 3,656,764 | 4/1972 | Robinson | 277/92 |
| 3,761,145 | 9/1973 | Schumacher | 277/92 |
| 4,087,100 | 5/1978 | Yoshihashi | 277/92 |

FOREIGN PATENT DOCUMENTS 1027222  2/1953  France ........................................ 277/92

*Primary Examiner*—Robert I. Smith
*Attorney, Agent, or Firm*—Eddie E. Scott

[57] ABSTRACT

A rolling cone cutter earth boring bit is provided with a seal assembly for sealing the bearings of the bit from the abrasive materials in the borehole and retaining lubricant within the bearing area. A rolling cone cutter is rotatably mounted on a cantilevered bearing pin extending from the bit body. A first seal receiving surface is located on said bearing pin. The first seal receiving surface has a first corner. A second seal receiving surface is located on said rolling cone cutter. The second seal receiving surface has a second corner. The seal assembly includes first and second seal units. The first seal unit comprises a first annular substantially rigid ring and a first substantially resilient ring positioned between said bearing pin and said rolling cone cutter. The first resilient ring is positioned in said first corner. The second seal unit comprises a second annular substantially rigid ring and a second substantially resilient ring positioned between said bearing pin and said rolling cone cutter. The second resilient ring is positioned in said second corner. The sliding interface between said first and second annular substantially rigid rings is inclined with respect to said bearing pin. The first and second substantially rigid rings are made of materials such as Teflon, nylon, plastic, metal or other substantially rigid materials.

7 Claims, 3 Drawing Figures

ROTARY BEARING SEAL FOR DRILL BITS

TECHNICAL FIELD

The present invention relates to the art of rolling cone cutter earth boring bits and, more particularly, to a rolling cone cutter earth boring bit with improved means for sealing the bearings of the bit from the abrasive materials in the borehole and retaining lubricant within the bearing area.

BACKGROUND OF THE INVENTION

A rolling cone cutter earth boring bit includes a main bit body adapted to be connected to a rotary drill string. The bit includes rotatable cone cutters mounted on individual bearing pins extending from the main bit body. Bearing systems are provided between the cone cutters and the bearing pins to promote rotation of the cutters and means are provided on the outer surface of the cone cutters for disintegrating the earth formations as the bit and the cutters rotate. A sufficient supply of uncontaminated lubricant must be maintained proximate the bearing systems throughout the lifetime of the bit. Various forms of seals have been provided between the cone cutters and the bearing pins upon which they are mounted to retain lubricant and prevent contamination; however, the need for new sealing systems is as acute today as any time in the history of rock drilling.

A rolling cone cutter earth boring bit must operate under very severe conditions, and the size and geometry of the bit is restricted by the operating characteristics. At the same time, a longer lifetime and improved performance is needed from the bit. In attempting to provide an improved bit, new and improved materials have been developed for the cutting structure of the cone cutters. They have provided a longer useful lifetime for the cone cutters. This has resulted in the bearing systems of the bit being often the first to fail during the drilling operation. Consequently, a need exists for new and improved bearing systems to extend the useful lifetime of the bit and to allow development of other elements that interact with the sealing and bearing systems. In attempting to improve the bearing systems, new and improved sealing systems are needed to maintain the bearing area free of harmful materials and retain lubricant. In attempting to provide such new sealing systems, great care must be taken that the overall capacity of the bearing systems is not reduced.

DESCRIPTION OF PRIOR ART

In U.S. Pat. No. 3,761,145 to Percy W. Schumacher, Jr., patented Sept. 25, 1973, a drill bit seal means is shown. A drill bit including a roller cutter mounted on a greased bearing journal having a grease seal ring therearound and resilient means mounted between the seal ring and bearing journal to urge the seal ring against a sealing surface on the cutter in such a manner that the seal ring may be forced away from the cutter surface by some predetermined pressure from within the cutter but wherein the seal ring arrangement provides a substantially positive seal from pressures externally of the cutter to prevent detritus or other foreign material from entering into the bearing area interiorly of the drill bit cutter is provided. Elastomeric material may be provided between the seal ring and the cutter sealing surface.

In U.S. Pat. No. 3,656,764 to William P. Robinson, patented Apr. 18, 1972, a seal assembly for a drill bit is shown. An earth boring drill bit employing roller cutters is provided with an improved seal for inhibiting ingress of abrasive materials into the bearing surfaces and egress of lubricant. The improved seal is between an outwardly facing reentrant corner on the journal and an inwardly facing reentrant corner on the cutter. The seal is made by a pair of O-rings engaging the opposed re-entrant corners and separated by a floating rigid ring having opposed bearing surfaces for seating the O-rings into the corners. This seal accommodates radial, axial and angular displacements of almost twice the magnitude that can be accommodated by a single O-ring of the size of one of the O-rings without significantly increasing the length of journal needed for the seal.

In U.S. Pat. No. 3,604,523 to Carl L. Liche, a silicone carbide coated graphite seal is shown. The seal ring is shown positioned in a roller bit cone. The seal assembly utilizes one silicone carbide coated graphite seal ring.

DESCRIPTION OF OTHER ART

The present invention is within the rolling cone cutter earth boring bit art and the other art described below is not relevant prior art; however, a review of this art should prove helpful in understanding the present invention. In U.S. Pat. No. 3,073,657 to R. V. Oxford, patented Jan. 15, 1963, a rotary seal is shown. In U.S. Pat. No. 3,073,689 patented Jan. 15, 1963, a method of producing mating sealing surfaces is shown. In U.S. Pat. No. 3,216,513, patented Nov. 9, 1965, a rotary wheel type rock cutter for tunnel boring and raise drilling operations is shown.

SUMMARY OF THE INVENTION

The present invention provides an improved sealing system for an earth boring bit. The sealing system acts as a barrier to the drilling fluid, pulverized cuttings and other materials in the borehole to prevent the materials from entering the bearing area of the bit and retains lubricant within said bearing area. An earth boring bit body is provided. A bearing pin extends from the bit body. A rolling cutter is rotatably mounted on the bearing pin. Bearing means are located between the rolling cutter and the bearing pin upon which it is mounted. The rolling cutter has a cutter mouth. A seal assembly is positioned in said cutter mouth around the bearing pin and is located between said bearing pin and said rolling cutter. The cutter assembly includes first and second seal units. The first seal unit comprises a first annular substantially rigid ring and a first substantially resilient ring positioned between said bearing pin and said rolling cone cutter. The first resilient ring is positioned in a corner on the bearing pin. The second seal unit comprises a second annular substantially rigid ring and a second substantially resilient ring positioned between said bearing pin and said rolling cone cutter. The second resilient ring is positioned in a corner on the rolling cone cutter. The sliding interface between said first and second annular rigid rings is inclined with respect to said bearing pin. The above and other features and advantages of the present invention will become apparent upon consideration of the following detailed description of the invention when taken in conjunction with the accompanying drawings.

DETAILED DESCRIPTION OF THE INVENTION

Figure 1:
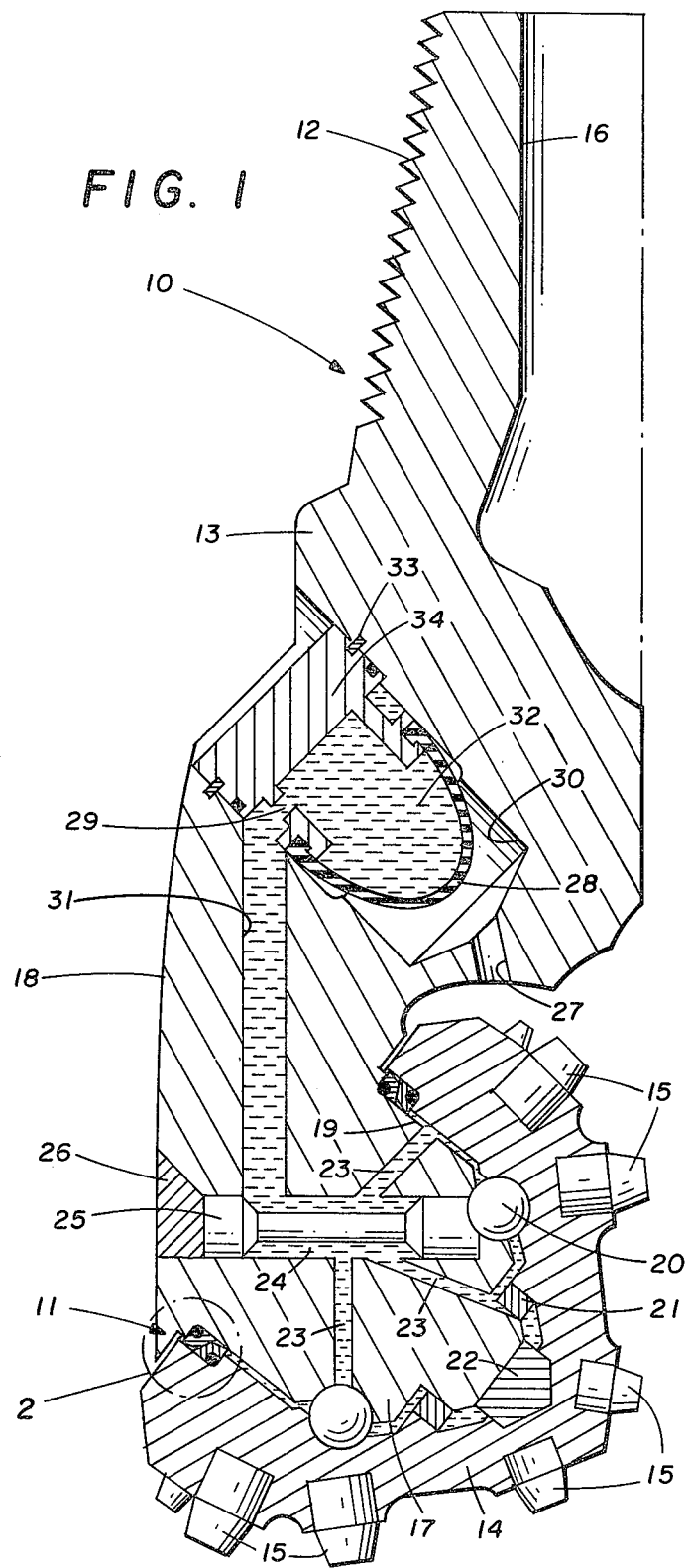
FIG. 1 is an illustration of an earth boring bit constructed in accordance with the present invention.

Referring now to FIG. 1, a sectional view of one arm 18 of a three-cone rotary rock bit 10 is shown. It is to be understood that the structure of the other two arms are substantially identical to the arm 18. A cutter 14 is rotatably positioned on the journal portion or bearing pin 17 of the arm 18 and adapted to disintegrate the earth formations as the bit 10 is rotated. The bearing pin 17 projects from the cutter receiving surface 35 of the arm 18. The cutting structure 15 on the surface of cutter 14 contacts and disintegrates the formations in a manner that is well known in the art. The cutting structure 15 is shown in the form of tungsten carbide inserts. However, it is to be understood that other cutting structures such as steel teeth may be used as the cutting structure on the cone cutter 14.

The body 13 of the bit 10 includes an upper threaded portion 12 that allows the bit 10 to be connected to the lower end of a rotary drill string (not shown). The bit 10 also includes a central passageway 16 extending along the central axis of the bit to allow drilling fluid to enter from the upper section of the drill string (not shown) immediately above and pass downward to the bottom of the well bore to flush cuttings and drilling debris from the well bore.

A plurality of bearing systems are located in the bearing area between the cutter 14 and the bearing pin 17. The bearing systems in the bearing area include an outer friction bearing 19, a series of ball bearings 20, an inner friction bearing 21, and a thrust button 22. A seal assembly generally designated by the reference number 11 is positioned between the cutter 14 and the bearing pin 17. The seal assembly 11 retains lubricant in the bearing area around the bearing systems and prevents any materials in the well bore from entering the bearing area. Passageways 23 and 24 are provided to allow lubricant to be transmitted to the bearing systems. The passageway 24, as shown, also allows the balls that make up the ball bearing system 20 to be inserted into position after the cone cutter 14 is placed on the bearing pin 18. The series of ball bearings 20 serves to lock the cone cutter 14 on bearing pin 18. After the balls are in place, a plug 25 is inserted into the passageway 24 and welded therein by weld 26. Plug 25 has a reduced diameter throughout the major portion of its length to allow lubricant to be transmitted to the bearing area. The additional passageways 23 extend from passageway 24 to the bearing area to insure a sufficient supply of lubricant to bearings 19, 20, 21 and 22.

A bore 30 extends into the body 13 from the surface of the bit body. A passage 31 extends from the bore 30 to the passageway 24. A lubricant reservoir 32 is located in the bore 30. The lubricant reservoir 32 is located between a flexible diaphragm 28 and a reservoir cap 34. An O-ring seal prevents borehole fluid from by-passing the upper portion of the reservoir cap 34 and lubricant within the lubricant reservoir 32 from escaping into the borehole. A retaining ring 33 holds reservoir cap 34 in position in bore 30. A flexible diaphragm 28 prevents lubricant in the lubricant reservoir 32 from escaping into the bore 30 and fluid in the borehole that has entered bore 30 through passage 27 from entering the lubricant reservoir 32. Lubricant within the lubricant reservoir 32 is channeled into the passage 31 through opening 29 and is directed to the bearings.

Figure 2:
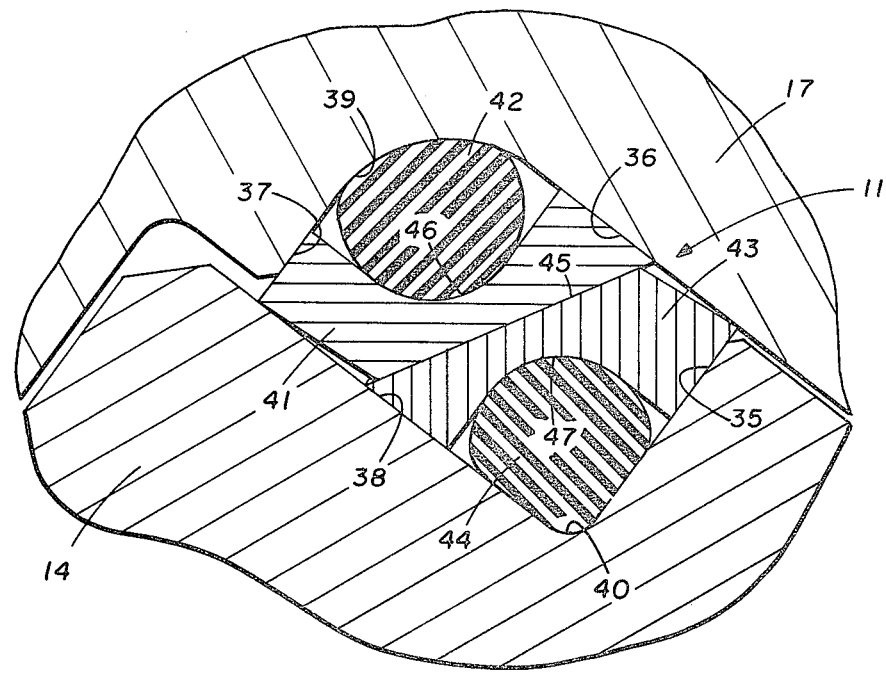
FIG. 2 is an enlarged view of the seal assembly of the bit shown in FIG. 1.

Referring now to FIG. 2, an enlarged view of the seal assembly 11 is shown. The seal assembly 11 is positioned between a surface 36 on the bearing pin 17 and a surface 38 on the cone cutter 14. The seal assembly 11 is also positioned between the cutter surface 35 and the bearing pin surface 37. A first corner 39 is provided between the surfaces 36 and 37 on the bearing pin 17. A second corner 40 is provided between the surfaces 35 and 38 on the rolling cutter 14. The seal assembly 11 includes first and second seal units. The first seal unit comprises a first annular substantially rigid ring 41 and a first substantially resilient ring 42 positioned between the bearing pin 17 and the rolling cone cutter 14. The first resilient ring 42 is positioned in the first corner 39. The second seal unit comprises a second annular substantially rigid ring 43 and a second substantially resilient ring 44 positioned between the bearing pin 17 and the rolling cone cutter 14. The second resilient ring 44 is positioned in said second corner 40. The sliding interface 45 between said first and second annular rigid rings is inclined with respect to said bearing pin 17.

The sealing assembly 11 acts as a barrier to the pulverized cuttings and other abrasive materials in the borehole to prevent these materials from entering the bearing area of the bit and retains lubricant within the bearing area. A double-urged seal group is provided. Prior double-urged seal groups required space envelopes too large to fit the limited space available in a rock bit cone bearing. Applicant's work has culminated in the development of the seal assembly 11 that will fit a considerably reduced seal envelope. This small seal envelope has resulted in a minimum negative impact on total cone bearing load capacity.

The seal assembly 11 is a full floating double elastomer-urged face-to-face seal of a substantially rigid material suitable for sliding application. Examples of such material are Teflon, nylon, plastic, metal, etc. The seal assembly 11 is miniturized and adapted for use in a rock bit in a manner that minimizes the loss of bearing capacity of the rock bit by minimizing the space loss to the seal in the bearing envelope. The first and second seal units cooperate when the rolling cone cutter 14 is mounted on the bearing pin 17. The first and second resilient rings urge the first and second annular rigid rings into sliding contact as the cone cutter 14 rotates about the bearing pin 17. With the sliding interface 45 inclined to the bearing pin 17 a seal envelope is provided that takes up less space both radially and axially than would be taken up by existing double-urged seal groups. A greater face-to-face sealing surface is provided and the resilient rings 42 and 44 are retained in the corners 39 and 40. The resilient rings 42 and 44 are also retained in the recesses 46 and 47 of the annular rigid rings 41 and 43 respectively.

The structural details of an earth boring bit 10 constructed in accordance with the present invention having been described, the operation of the bit 10 will now be considered with reference to FIGS. 1 and 2. The lubrication system of the bit 10 is filled with a suitable lubricant. The bit is rotated and thrust downward, thrusting the cutter 14 against the earth formations. Continued rotation with the drill string applying a thrust force to the bit 10 causes the cutters to disintegrate the formations and form the desired borehole. The present invention provides a seal assembly 11 in the cone mouth of the cutter 14 which will act as a barrier to the pulverized cuttings, the borehole fluid and any other materials in the borehole. The seal assembly 11 acts to prevent these materials from entering the bearing area through the cone mouth opening, thus providing an uncontaminated environment for the metal bearing elements and eliminating the abrasive wearing action of foreign materials in the bearing area. The lubricant is retained within the bit 10 by the seal assembly 11 to assure a long lifetime for the bearing systems.

Figure 3:
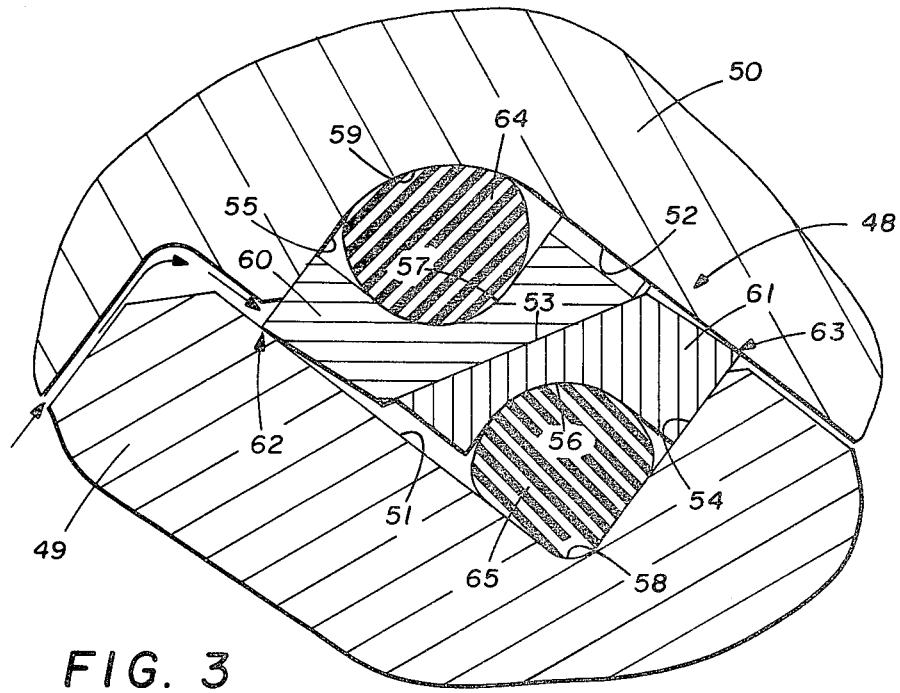
FIG. 3 illustrates another embodiment of the present invention.

Referring now to FIG. 3, another embodiment of a seal assembly constructed in accordance with the present invention is shown. The seal assembly 48 is positioned between a surface 52 on the bearing pin 50 and a surface 51 on the cone cutter 49. The seal assembly 48 is also positioned between the cutter surface 54 and the bearing pin surface 55. A first corner 59 is provided between the surfaces 52 and 55 on the bearing pin 50. A second corner 58 is provided between the surfaces 51 and 54 on the rolling cutter 49. The seal assembly 48 includes first and second seal units. The first seal unit comprises a first annular rigid ring 60 and a first resilient ring 64 positioned between the bearing pin 50 and the rolling cone cutter 49. The first resilient ring 64 is positioned in the first corner 59. The second seal unit comprises a second annular rigid ring 61 and a second resilient ring 65 positioned between the bearing pin 50 and the rolling cone cutter 49. The second resilient ring 65 is positioned in said second corner 58. The sliding interface 53 between said first and second annular rigid rings is inclined with respect to said bearing pin 50. A wiper lip 62 is provided on the rigid ring 60. The wiper lip contacts surface 51 on the rolling cutter 49. A wiper lip 63 contacts surface 52 on bearing pin 50. The wiper lips 62 and 63 are made of a nonscratching material. The material must be flexible, i.e., Teflon, so that the wiper lips 62 and 63 can contact the metal surfaces 51 and 52 but not scar the finish.

The present invention provides a seal assembly 48 in the cone mouth of the cutter 49 which will act as a barrier to the pulverized cuttings, the borehole fluid and any other materials in the borehole. The seal assembly 48 acts to prevent these materials from entering the bearing area through the cone mouth opening, thus providing an uncontaminated environment for the metal bearing elements and eliminating the abrasive wearing action of foreign materials in the bearing area. The lubricant is retained within the bit by the seal assembly 48 to assure a long lifetime for the bearing systems.

The embodiments of the invention in which an exclusive property or privilege is claimed are defined as follows:

1. A rolling cone cutter earth boring bit, comprising:
   a bit body;
   a cantilevered bearing pin extending from said bit body;
   a rolling cone cutter rotatably mounted on said bearing pin;
   a seal envelope between said bearing pin and said rolling cone cutter;
   a first annular substantially rigid ring positioned around said bearing pin and located in said seal envelope, said first annular substantially rigid ring having a first sealing surface that is inclined with respect to said bearing pin;
   a first substantially resilient ring positioned around said bearing pin and located in said seal envelope;
   a second annular substantially rigid ring positioned around said bearing pin and located in said seal envelope, said second annular substantially rigid ring having a second sealing surface that is inclined with respect to said bearing pin; and
   a second substantially resilient ring positioned around said bearing pin and located in said seal envelope, said first and second annular rigid rings and resilient rings cooperating when said rolling cone cutter is mounted on said bearing pin whereby said first and second resilient rings urge said first and second sealing surfaces of said first and second annular rigid rings into sliding contact as said cone cutter rotates about said bearing pin thereby providing a sliding interface between said first and second annular rigid rings with said sliding interface being inclined to said bearing pin thereby minimizing the size of said seal envelope.

2. The earth boring bit of claim 1 wherein first and second corners are provided in said seal envelope diagonally across said seal envelope from each other, with said first corner provided on said bearing pin and said second corner provided on said rolling cone cutter with said first and second resilient rings being located in said first and second corners respectively.

3. The earth boring bit of claim 2 wherein said first and second annular rigid rings have first and second recesses and said first and second resilient rings are located in said first and second recesses respectively.

4. A rolling cone cutter earth boring bit, comprising:
   a bit body;
   a cantilevered bearing pin extending from said bit body;
   a rolling cone cutter rotatably mounted on said bearing pin;
   bearing and cutter retaining means between said bearing pin and said cone cutter;
   a seal envelope between said bearing pin and said rolling cone cutter;
   a first seal receiving surface on said bearing pin and located in said seal envelope, said first seal receiving surface having a first corner;
   a second seal receiving surface on said rolling cone cutter and located in said seal envelope, said second seal receiving surface having a second corner located diagonally across said seal envelope from said first seal receiving surface;
   a first seal unit comprising a first annular rigid ring and a first resilient ring positioned between said bearing pin and said rolling cone cutter, said first resilient ring positioned in said first corner; and
   a second seal unit comprising a second annular rigid ring and a second resilient ring positioned between said bearing pin and said rolling cone cutter, said second resilient ring positioned in said second corner with a sliding interface between said first and second annular rigid rings that is inclined to said bearing pin thereby minimizing the size of said seal envelope.

5. The earth boring bit of claim 4 wherein said first and second annular rigid rings have first and second recesses and said first and second resilient rings are located in said first and second recesses respectively.

6. A rolling cone cutter earth boring bit, comprising:
   a bit body; said bit body having at least one downwardly extending arm;
   a cantilevered bearing pin extending from said arm;

a rolling cone cutter adapted to be rotatably mounted on said bearing pin;

bearing and cutter retaining means between said bearing pin and said rolling cone cutter;

a seal envelope between said bearing pin and said rolling cone cutter;

a first seal receiving surface on said bearing pin and located in said seal envelope;

a second seal receiving surface on said rolling cone cutter and located in said seal envelope;

a first seal unit comprising a first annular rigid ring and a first resilient ring positioned between said bearing pin and said rolling cone cutter, said first resilient ring engaging said first seal receiving surface;

a second seal unit comprising a second annular rigid ring and a second resilient ring positioned between said bearing pin and said rolling cone cutter, said second resilient ring engaging said second seal receiving surface; and a sliding interface between said first and second annular rigid rings, said sliding interface inclined with respect to said bearing pin thereby minimizing the size of said seal envelope.

7. A rolling cone cutter earth boring bit, comprising:

a bit body, said bit body having at least one downwardly extending arm with said arm;

a cantilevered bearing pin extending from said arm;

a rolling cone cutter adapted to be rotatably mounted on said bearing pin, said rolling cone cutter having a cone mouth;

bearing and cutter retaining means between said bearing pin and said cone cutter;

a seal envelope in said cone mouth between said rolling cone cutter and said bearing pin;

a first seal unit positioned around said bearing pin within said seal envelope, said first seal unit comprising a first annular rigid ring positioned around said bearing pin and a first resilient ring located between said first annular rigid ring and said bit body; and a second seal unit positioned around said bearing pin within said seal envelope diagonally across said seal envelope from said first seal unit, said second seal unit comprising a second annular rigid ring positioned around said bearing pin and a second resilient ring located between said second annular rigid ring and said cone cutter, said first and second seal unit cooperating when said rolling cone cutter is mounted on said bearing pin whereby said first and second resilient rings urge said first and second annular rigid rings into sliding contact as said cone cutter rotates about said bearing pin with said sliding contact forming a sliding interface that is inclined with respect to said bearing pin thereby minimizing the size of said seal envelope.

* * * * *